(12) United States Patent
Minagawa et al.

(10) Patent No.: US 8,001,210 B2
(45) Date of Patent: Aug. 16, 2011

(54) TRANSMISSION AND RECEPTION OF DISPLAY INFORMATION THAT CONFIGURES A SCREEN WITH MULTIPLE SCREEN ELEMENTS

(75) Inventors: Hiroshi Minagawa, Tokyo (JP); Mitsuteru Fukushima, Tokyo (JP); Tadashi Tsushima, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 1163 days.

(21) Appl. No.: 11/420,119

(22) Filed: May 24, 2006

(65) Prior Publication Data

US 2006/0277497 A1    Dec. 7, 2006

(30) Foreign Application Priority Data

May 25, 2005    (JP) ................ P2005-153124

(51) Int. Cl.
*G06F 15/16* (2006.01)
(52) U.S. Cl. ............ 709/217; 709/218; 709/219
(58) Field of Classification Search ........... 709/217–219
See application file for complete search history.

(56) References Cited

U.S. PATENT DOCUMENTS

| | | | |
|---|---|---|---|
| 6,105,042 A | 8/2000 | Aganovic et al. | |
| 6,281,874 B1 * | 8/2001 | Sivan et al. | 345/660 |
| 7,167,730 B2 * | 1/2007 | Shibata et al. | 455/566 |
| 2004/0183828 A1 | 9/2004 | Nichogi et al. | |
| 2006/0048051 A1 * | 3/2006 | Lazaridis | 715/517 |
| 2006/0053468 A1 | 3/2006 | Sudoh et al. | |

FOREIGN PATENT DOCUMENTS

| | | |
|---|---|---|
| EP | 1441308 | 7/2004 |
| JP | 61-184634 | 8/1986 |
| JP | 7-049758 | 2/1995 |
| JP | 8-305873 | 11/1996 |
| JP | 9-022338 | 1/1997 |
| JP | 2003-162468 | 6/2003 |
| JP | 2003-323244 | 11/2003 |
| JP | 2003-323244 A | 11/2003 |
| JP | 2004-343683 | 12/2004 |
| WO | 2005/022404 | 3/2005 |
| WO | 2005/022404 A1 | 3/2005 |

OTHER PUBLICATIONS

English language Abstract, partial translation and computer-generated translation of JP 2003-323244 A.
English language Abstract of JP 61-184634, Aug. 18, 1986.
Japan Office action, dated Mar. 1, 2011 along with an english translation thereof.

(Continued)

*Primary Examiner* — Shawki S Ismail
(74) *Attorney, Agent, or Firm* — Greenblum & Bernstein, P.L.C.

(57) ABSTRACT

A cellular phone does not store information unnecessary for displaying a screen and transmits a screen display request including an identifier of a screen to be displayed next to a server apparatus. In response to the screen display request, the server apparatus reads a display information file including screen elements for configuring the screen from a database and sends the file to the cellular phone. The cellular phone generates a screen using the screen elements included in the display information file and displays the generated screen on a display device. The display information file is prepared as one file for each screen displayed on the cellular phone. The file includes information of all screen elements necessary for the screen and does not include information of any screen elements unnecessary for the screen.

21 Claims, 7 Drawing Sheets

OTHER PUBLICATIONS

Tsutomu Kamimori, "50 techniques to color the WEB, 20 methods of HTML design, MdN", May 2001, Japan, vol. 85, May 1, 2001, pp. 50-51, and partial English langugae translation thereof.

Japan Office action in JP Pat. Appl. No. 2005-153124, dated Jun. 14, 2011 along with an English translation thereof.

\* cited by examiner

TRANSMISSION AND RECEPTION OF DISPLAY INFORMATION THAT CONFIGURES A SCREEN WITH MULTIPLE SCREEN ELEMENTS

CROSS REFERENCE TO RELATED APPLICATION

The present disclosure relates to subject matter contained in Japanese Patent Application No. 2005-153124, filed on May 25, 2005, the disclosure of which is expressly incorporated herein by reference in its entirety.

BACKGROUND OF THE INVENTION

1. Field of the Invention

The present invention relates to a configuration of display information, which configures one screen with multiple screen elements.

2. Description of the Related Art

In an information processing apparatus, various screens are displayed on a display device according to processing. The contents of the screen are not always completely different for each screen. Elements common to different screens are often used. Even when a number of elements common to multiple screens is large, different display information is prepared for a different screen. This causes a disadvantageous a storage capacity necessary for storing display information. Unexamined Japanese Patent Publications Nos. 9-22338 and 8-305873 disclose the technique in which elements used in common to the multiple screens are standardized and elements necessary for each screen are used to generate each screen.

In order to generate a screen to be displayed on the display device using elements, all elements prepared for the relevant screen must be read from a storage device. When each element is stored as one file in the storage device, the number of times necessary for searching the relevant file will be increased. Unexamined Japanese Patent No. 8-305873 discloses a technique in which elements of the same type are stored together as one file to reduce a processing load applied when the elements are read from the storage device.

In recent years, cellular phones with an information management function and an Internet connection function have come into wide use. The cellular phones have served functions that are performed by general information processing apparatuses (personal computer, PDA, and the like). However, unlike the dedicated information processing apparatuses, the user cannot typically expand memory in the cellular phone to increase the storage capacity. As compared with the general information processing apparatuses, significant restrictions are imposed on the processing ability of the cellular phones in view of their particular storage capacity.

Many cellular phones do not prestore display information, which is necessary for screen display onto the display device, in the storage device. Such information is downloaded from the server apparatus to the cellular phone. When the elements of the same type are stored together as one file as disclosed in Unexamined Japanese Patent No. 8-305873, this is advantageous in view of the storage capacity of the server apparatus, but an amount of information, which is temporarily stored in the storage device of the cellular phone, will be increased. This method is extremely disadvantageous with cellular phones having restrictions on their storage capacities.

Even if each element is stored as one file in the storage device, not only information of the element itself but also information, which is irrelevant to the element itself such as a file header, is included in the file, When the individual file is transmitted to the cellular phone from the server apparatus for each element necessary for generating the screen, much information, which is originally unnecessary for screen display is temporarily stored in the storage device of the cellular phone. This method is extremely disadvantageous with cellular phones having restrictions on their storage capacities.

Regarding a communication rate at which information is transmitted and received to and from the cellular phone, a specification has been officially released to show the maximum communication rate. However, when multiple cellular phones transmit and receive information via the same base station, channel capacity is distributed among the multiple cellular phones. Unlike a high speed connecting such as DSL and optical fiber, etc., the communication rate is sometimes greatly reduced, depending on the condition, as compared with the value shown in the released specification. The reduction in the load to be applied to the network becomes an important element when the cellular phones transmit and receive information.

SUMMARY OF THE INVENTION

An object of the present invention is to reduce a processing load applied to a terminal apparatus in displaying a screen including multiple screen elements and to reduce a load applied to a network in transmitting and receiving screen elements included in the screen.

A display information transmitting method according to the first aspect of the present invention is executed by a server apparatus connected to, via a network, a terminal apparatus having a display device that displays a screen including a plurality of screen elements.

The display information transmitting method receives a screen display request corresponding to a next screen to be displayed next from the terminal apparatus via the network when a current screen displayed on the display device will be changed. The display information transmitting method further reads a display information file corresponding to the screen display request from a display information file storage device that stores display information files, each file including all screen elements of the corresponding screen and no screen elements unrelated to the corresponding screen. The display information transmitting method further transmits the read display information file to the terminal apparatus via the network.

A display information receiving method according to the second aspect of the present invention is executed by a terminal apparatus connected to a server apparatus via a network and having a display device that displays a screen including a plurality of screen elements.

The display information receiving method transmits screen display request corresponding to a next screen to be displayed next when a current screen displayed on the display device will be changed. The display information receiving method further receives a display information file, which includes all screen elements of the next screen and no screen elements unrelated to the next screen, The display information receiving method stores the received display information file in a storage device. The display information receiving method further generates generating a next screen to be displayed on the display device based on screen elements included in the stored display information file. The display information receiving method further displays the generated next screen on the display device.

In the display information transmitting method according to the first aspect and the display information receiving method according to the second aspect, a screen display request corresponding to a next screen to be displayed next is transmitted to the server apparatus from the terminal apparatus via the network when a current screen displayed on the display device will be changed. In the server apparatus, which executes the display information transmitting method, a display information file corresponding to the screen display request is read from the display information file storage device.

The read display information file is transmitted to the terminal apparatus from the server apparatus via the network. In the terminal apparatus, which executes the display information receiving method, the received display information file is stored in a storage device. In the terminal apparatus, the next screen to be displayed on the display device is generated based on screen elements included in the stored display information file and displayed on the display device.

The terminal apparatus receives the display information file transmitted from the server apparatus and stores the received display information file in the storage device. The display information file includes all screen elements of the next screen and no screen elements unrelated to the next screen. Since the display information file necessary for displaying the next screen is only one file, information such as a file header, which is unnecessary for generating the next screen, can be reduced, An amount of storage capacity of the storage device in the terminal apparatus can be small to store information for displaying the next screen. The terminal apparatus does not have to process multiple files, thereby allowing the next screen to be easily generated. The amount of information transmitted to the terminal apparatus from the server apparatus can also be small, thereby making it possible to reduce a load applied to the network.

The terminal apparatus transmits the screen display request to the server apparatus when changing a current screen to be displayed, generates the next screen using the display information file sent based on the screen display request, and displays the generated next screen. Am amount of information, which must be prepared in the terminal apparatus, can be small, thus allowing a reduction in the storage capacity of the terminal apparatus. The server apparatus stores the display information files, each of which corresponds to each screen display request, in the display information file storage device. The server apparatus can immediately send the corresponding display information file to the terminal apparatus in response to the screen display request from the terminal apparatus.

A display information transmitting method according to the third aspect of the present invention is executed by a server apparatus connected to, via a network, a terminal apparatus having a display device that displays a screen including with a plurality of screen elements.

The information transmitting method receives a next screen to be displayed next from the terminal apparatus via the network when a current screen displayed on the display device will be changed, The information transmitting method further extracts all necessary screen elements of the a screen corresponding to the screen display request from a screen element library storage device that stores screen elements of screens to be displayed on the display device of the terminal apparatus. The information transmitting method further generates the display information file using the extracted screen elements. The information transmitting method further transmits the generated display information file to the terminal apparatus via the network.

In respect to the display information transmitting method according to the third aspect of the present invention, the display information receiving method according to the second aspect of the present invention is executed.

In the display information transmitting method according to the third aspect and the display information receiving method according to the second aspect, a screen display request corresponding to a next screen to be displayed next is transmitted to the server apparatus from the terminal apparatus transmits when a current screen displayed on the display device will be changed. In the server apparatus, which executes the display information transmitting method, screen elements of screens to be displayed on the terminal apparatus are stored in the screen element library storage device. All screen elements of the screen corresponding to the screen display request are extracted from a screen element library storage device to generate a display information file that includes all screen elements of the next screen and no screen elements unrelated to the next screen.

The generated display information file is transmitted to the terminal apparatus from the server apparatus via the network. In the terminal apparatus, which executes the display information receiving method, the received display information file is stored in a storage device. In the terminal apparatus, the next screen to be displayed on the display device is generated based on screen elements included in the stored display information file and displayed on the display device.

The terminal apparatus receives the display information file transmitted from the server apparatus and stores the received display information file in the storage device. Since the display information file necessary for displaying the display information is only one file, information such as a the header, which is unnecessary for generating the display information, can be reduced. An amount of storage capacity of the storage device in the terminal apparatus can be small to store information for displaying the display information. The terminal apparatus does not have to process multiple files, thereby allowing the display information to be easily generated. The amount of information transmitted to the terminal apparatus from the server apparatus can also be small, thereby making it possible to reduce a load applied to the network.

The display information file is not prepared in the server apparatus. The display information file is generated by extracting the screen elements, which correspond to the screen display request from the terminal apparatus, from the screen element library storage device. Since the server does not have to store the same screen elements redundantly, the capacity of the storage device necessary for the server apparatus can be reduced as much as possible.

A display information transmitting and receiving system according to the forth aspect of the present invention includes a server apparatus. The server apparatus includes a display information file storage device that stores a plurality of display information files, each of which includes all screen elements of the corresponding screen to be displayed on a terminal display device and no screen elements unrelated to the corresponding screen. The server apparatus includes a screen display request receiver that receives a screen display request. The server apparatus includes a display information file reader that reads a display information file corresponding to the received screen display request from the display information file storage device. The server apparatus includes a display information file transmitter that transmits the read display information file.

The display information transmitting and receiving system includes a terminal apparatus connected to the server apparatus via a network. The terminal apparatus has the terminal display device that displays a screen including a plurality of screen elements. The terminal apparatus includes a screen display request transmitter that transmits the screen display request corresponding to a next screen to be displayed next to the server apparatus via the network when a current screen displayed on the display device will be changed, The terminal apparatus includes a display information file receiver that receives the display information file transmitted in response to the transmitted screen display request. The terminal apparatus includes a display file storage device that stores the received display information file. The terminal apparatus includes a screen generator that generates a next screen to be displayed on the display device based on the screen elements included in the stored display information file. The terminal apparatus includes an information display controller that causes the display device to display the next screen generated by the screen generator.

A display information transmitting and receiving system according to the fifth aspect of the present invention includes a server apparatus.

The server apparatus includes a screen element library storage device that stores screen elements of screens to be displayed on a terminal display device. The server apparatus includes a screen display request receiver that receives a screen display request. The server apparatus includes a display information file generator that extracts all screen elements necessary for the screen corresponding to the received screen display request from the screen element library storage device to generate a display information file including the extracted screen elements but including no screen elements unrelated to the screen. The server apparatus further a display information file transmitter that transmits the generated display information file.

The display information transmitting and receiving system includes a terminal apparatus connected to the server apparatus via a network The terminal apparatus has the terminal display device that displays a screen including a plurality of screen elements. The terminal apparatus includes a screen display request transmitter that transmits the screen display request corresponding to a next screen to be displayed next to the server apparatus via the network when a current screen displayed on the display device will be changed. The terminal apparatus includes a display information file receiver that receives the display information file transmitted in response to the transmitted screen display request. The terminal apparatus includes a display file storage device that stores the received display information file. The terminal apparatus includes a screen generator that generates a next screen to be displayed on the display device based on the screen elements included in the stored display information file. The terminal apparatus includes an information display controller that causes the display device to display the next screen generated by the screen generator.

A display information file according to the sixth aspect of the present information is stored in a computer readable medium. The display information file is transmitted from a server apparatus via a network to a terminal apparatus and includes screen elements of a screen to be displayed on a display device of the terminal apparatus. The display information file includes all elements that of a screen to be displayed on the display device of the terminal apparatus and no elements unrelated to the screen.

In the present invention, a screen displayed on the display device does not have to be displayed in its entirety. The size of a screen to be displayed on the display device may be larger than that of the display device. The screen may be displayed by scrolling up and down and left and right. A current screen will be changed when a different screen, which cannot be displayed only by the scroll movement, is to be displayed on the display device. The display information file may adequately include all screen elements corresponding to each screen among screen elements which are prepared in the server apparatus. The screen, which is displayed on the display device of the terminal apparatus, may include screen elements, which are not prepared in the server apparatus but held in the terminal apparatus, and screen elements which are uniquely generated in the telling apparatus.

DETAILED DESCRIPTION OF THE PREFERRED EMBODIMENTS

Figure 1:
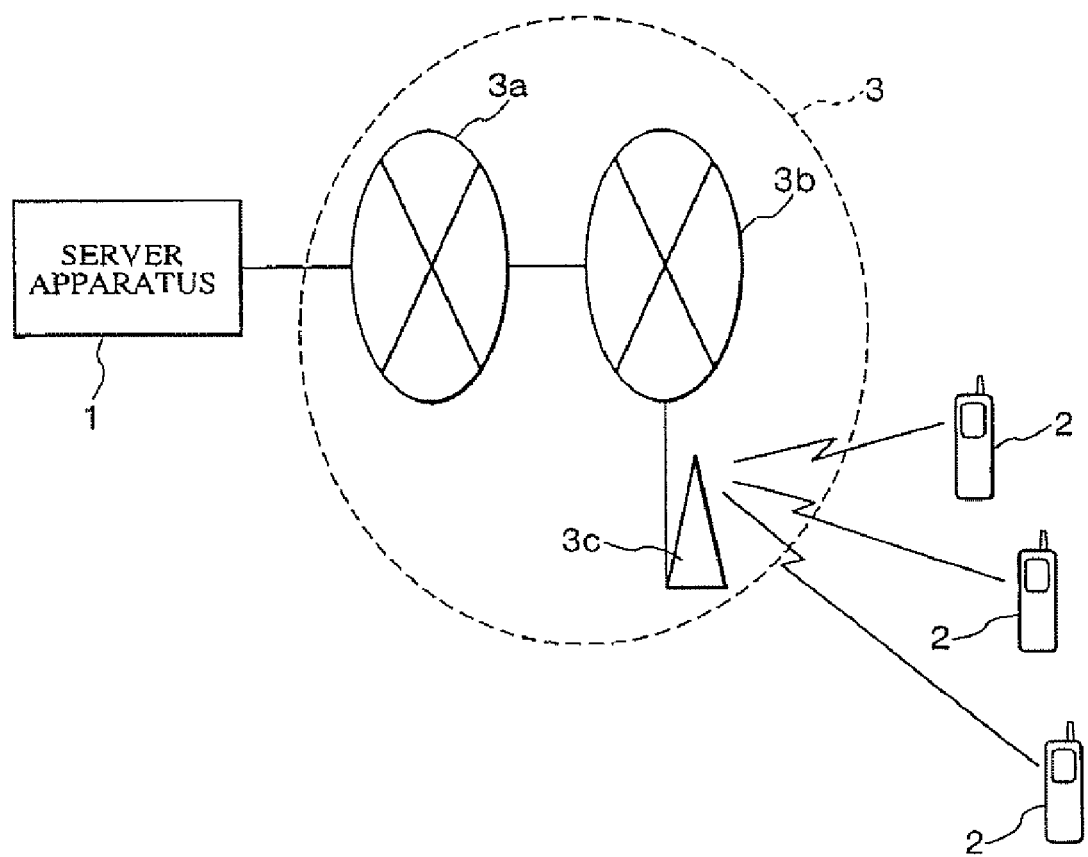
FIG. 1 is a block diagram illustrating a confirmation of a communication system according to a first embodiment of the present invention.

The following will specifically explain a first embodiment of the present invention with reference to the accompanying drawings. FIG. 1 is a block diagram illustrating a configuration of a communication system according to the embodiment. As illustrated in the figure, the communication system includes a server apparatus 1 and multiple cellular phones 2. Each of the cellular phones 2 is connected to the server apparatus 1 via a network 3. The network 3 includes at least the Internet 3a, a cellular phone network 3b, and a base station 3c. The server station 1 connects to the Internet 3a. The respective cellular phones 2 perform transmission and reception of information to and from the base station 3c.

Figure 2:
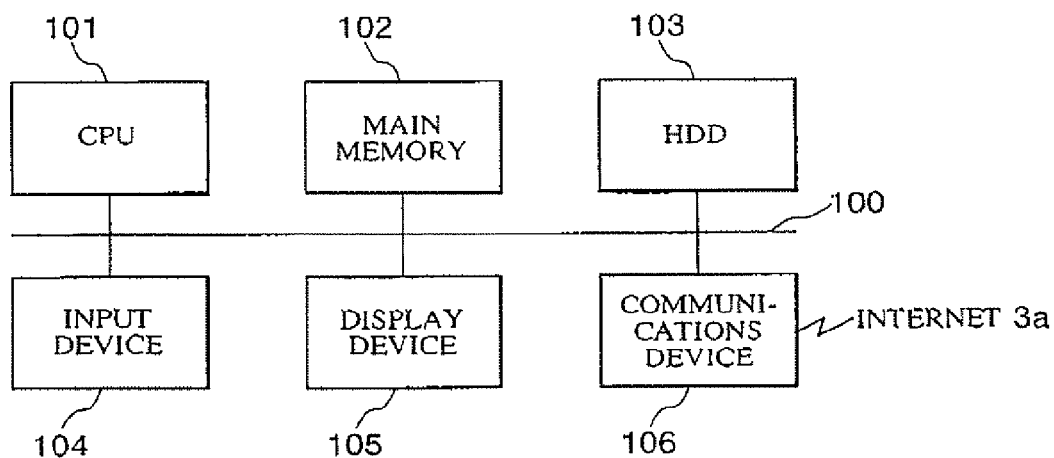
FIG. 2 is a block diagram illustrating a configuration of a server apparatus of FIG. 1.

The server apparatus 1 transmits a display information file that configures a screen to be displayed on the cellular phone 2 according to a screen display request (to be described later) sent from each cellular phone 2. FIG. 2 is a block diagram illustrating a configuration of the server apparatus 1. As illustrated in the figure, the server apparatus 1 includes a CPU (Central Processing Unit) 101, a in memory 102, an HDD (Hard Disk Drive) 103, an input device 104, a display device 105, and a communications device 106. These components 101 to 106 are connected to one another via a bus 100.

The CPU 101 executes a program transferred To the main memory 102 and carries out processing such as transmission of a display information file to be described later. The main memory 102 is a storage device that includes a semiconductor memory to provide a main storage area for the CPU 101. The HDD 103 is a storage device that provides a virtual storage area for the CPU 101. A display information file database (to be described later) is stored in the HDD 103. The program to be executed by the CPU 101 is stored in the HDD 103 and is transferred to the main memory 102 as required at an execution time.

The input device 104 inputs information necessary for creating the display information file (to be described later). The display device 105 displays the display information file and information necessary for creating the respective elements as a precondition for the display information file. In this embodiment, the display information file is stored in the prepared display file database of the HDD 103.

The communications device 106 performs data communication with the Internet 3a. The communications device 106 transmits and receives information to and from each cellular phone 2 via the network 3. Although there is a limitation in a communication rate (capacity) of data communication between the communications device 106 and the Internet 3a, there are few problems in the communication rate between the communications device 106 and the Internet 3a at the time of transmitting and receiving the display information file. However, a significant problem exists in the communication rate between the cellular phone 2 and the base station 3c at the time of transmitting and receiving the display information file.

Figure 3:
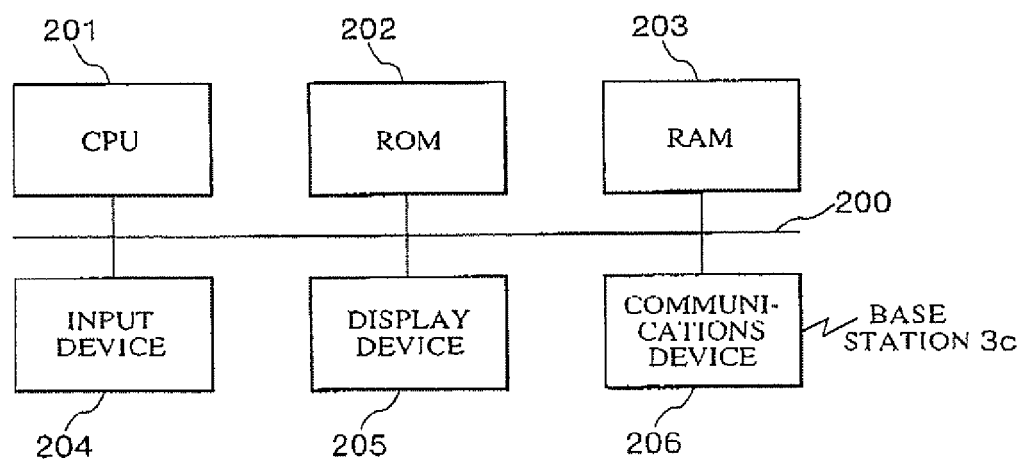
FIG. 3 is a block diagram illustrating a configuration of a cellular phone of FIG. 1.

The cellular phone 2 has an information management function and an Internet connection function. The cellular phone 2 receives the display information file from the server apparatus 1 and displays a screen corresponding to the display information file. FIG. 3 is a block diagram illustrating a configuration of the cellular phone 2. As illustrated in the figure, the cellular phone 2 includes a CPU 201, a ROM (Read Only Memory) 202, a RAM (Random Access Memory) 203, an input device 204, a display device 205, and a communications device 206. These components 201 to 206 are connected to one another via a bus 200. Although the cellular phone 2 also has a function for a telephone conversation, this function does not relate to the present invention and the illustration and explanation are omitted.

The CPU 201 executes a program stored in the ROM 202 and the RAM 203. The ROM 202 stores a boot program, an operating system program, and fixed data. The RAM 203 stores a program (program for transmitting and receiving the display information file to be described later) to be executed by the CPU 201 and is also used as a working area. The RAM 203 is battery backed up and data stored in the RAM 203 is not deleted even when the cellular phone 2 is turned OFF.

The input device 204 includes directional buttons for entering four directions of upper, lower, left, and right, an enter key and a cancel key in addition to numerical keys "0" to "9", a "*" key and a "#" key. The display device 205 displays a screen to be generated based on the display information file. The server apparatus 1 can recognize the specification such as a display size of the display device 205 of the cellular phone 2 which sent the screen display request based on its individual identification number. The display information file is prepared according to the specification of the display device 205. A screen to be displayed on the display device 205 is changed when a predetermined entry is given from the input device 204 or a predetermined processing is completed. In changing the screen, a screen display request, which corresponds to the screen to be displayed next, is sent to the server apparatus 1 from the cellular phone 2.

The communications device 206 performs data communication with the base station 3c. The communications device 206 transmits and receives information to and from the server apparatus 1 via the network 3. The communication rate of the communications device 206 depends on a communication condition of the base station 3c. The communication rate (capacity) between the base station 3c and the cellular phone 2 is decided based on the base station 3c. When the number of cellular phones 2, which are in communication with the same base station 3c, is only one, the communications device 206 can perform data communication at a maximum communication rate, which is given to the base station 3c.

When multiple cellular phones 2 perform data communication with one base station 3c at the same time, a channel capacity is distributed to each cellular phone, which is in data communication. For example, when two cellular phones 2 perform data communication with one base station 3c at the same time, the communication rate of each cellular phone 2 results in almost ½ of the maximum communication rate given to the base station 3c. When ten cellular phones 2 perform data communication with one base station 3c at the same time, the communication rate of each cellular phone 2 results in almost 1/10 of the maximum communication rate given to the base station 3c.

Figure 4A:
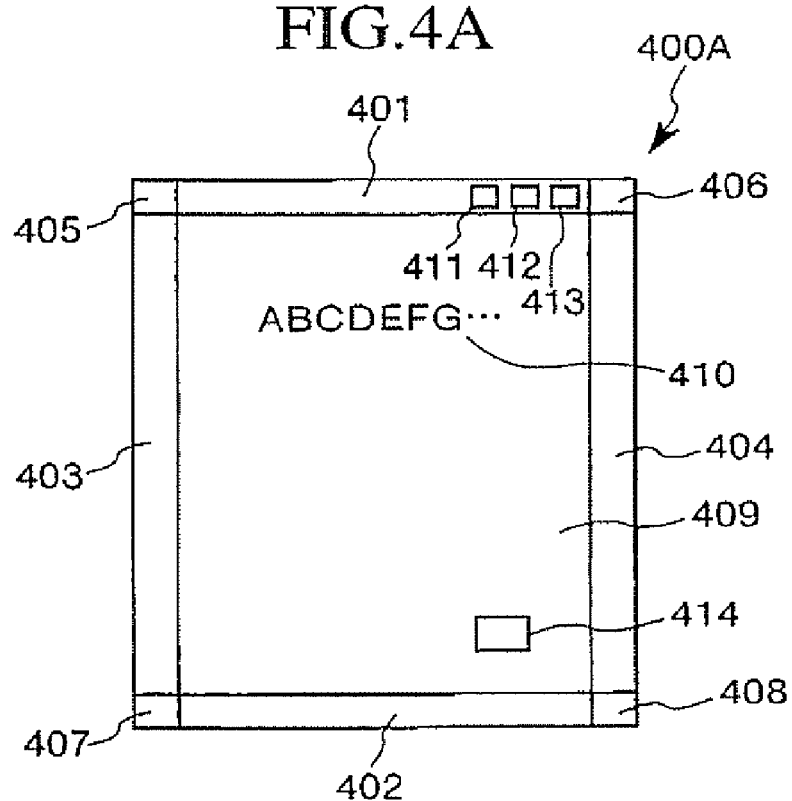
FIGS. 4A and 4B are views each illustrating a configuration of a screen to be displayed on a display device of the cellular phone.
Figure 4B:
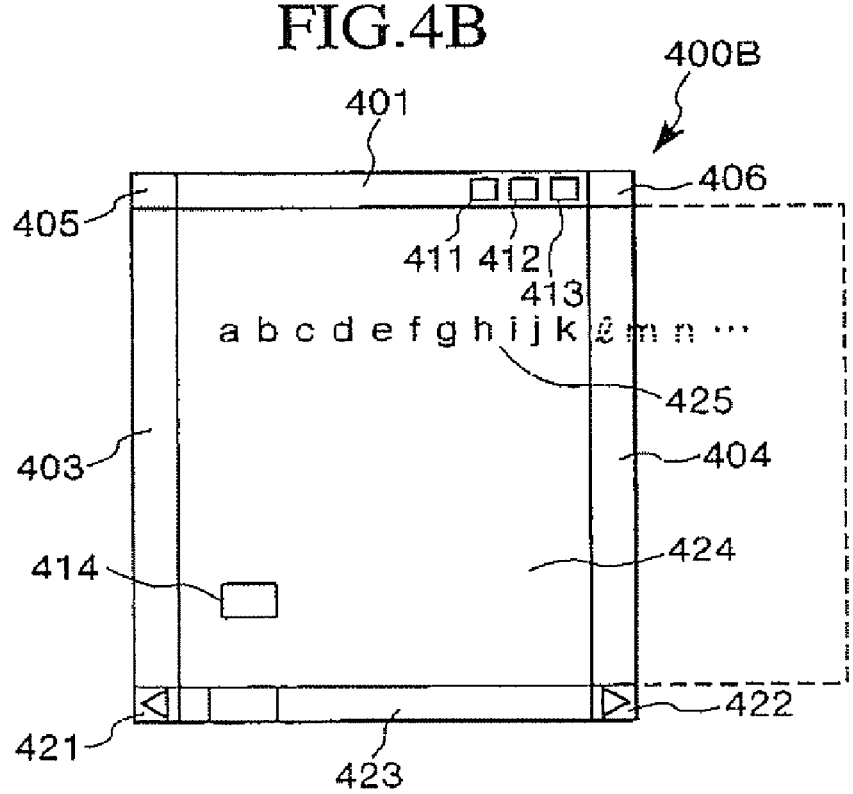

FIG. 4A and 4B are views each illustrating a configuration example of a screen displayed on the display device 205 of the cellular phone 2. A screen 400A shown in FIG. 4A includes eight display frames 401 to 408 of upper, lower, left, right, upper left, upper right, lower left, and lower right, and a background 409 displayed inside of the display frames 401 to 408. The screen 400A includes peculiar information 410, multiple icons 411 to 413 for operating the screen, and an icon 414 included in the peculiar information 410, each of which is displayed in front of the background 409. The display frames 401 to 408, the background 409, and the icons 411 to 414 are prepared as individual elements.

FIG. 4B illustrates a configuration example of a screen different from the screen 400A illustrated in FIG. 4A. As illustrated in FIG. 4B, the horizontal length of the screen 400B is larger t that of the display device 205. In order to scroll the screen 400B on the display device 205, the screen 400B includes scroll icons 421 and 422 in place of the display frames 407 and 408, and a scroll bar 423 in place of the display frame 402. The screen 400B includes a background 424 different from the screen 400A. Peculiar information 425 to e displayed in front of the background 424 is different from the peculiar information 410 of the screen 400A. The peculiar information 425 of the screen 400B includes the same icon 414 as that of the peculiar information 410 of the screen 400A, but the display position of the icon 414 on the screen 400A is different from that on the screen 400B. The icons 411 to 413 are shared the screen 400A and screen 400B.

When the directional button of the input device 204 is operated with the screens 400A or 400B displayed on the display device 205, a selectable icon is sequentially changed to the icons included in each screen (icons 411 to 414 in the screen 400A and icons 411 to 414, 421, 422 in The screen 400B). When the enter key is pressed from the input device 204 while any one of icons is selected, processing corresponding to the selected icon is performed.

For example, when the enter key is pressed while the icon 421 is selected on the screen 400B, information 425, which is placed in an area surrounded by the display frames 401, 403 to 406 and the scroll bar 423, is scrolled left. The scroll bar 423 is also changed according to the scroll. In both screens 400A and 400B, it is assumed that the icon 414 is used for instructing to change the screen to be displayed on the display device 205. In this case, when the enter key is pressed while the icon 414 is selected, a screen display request, which includes a screen identifier corresponding to the changed screen, is sent to the server apparatus 1.

Figure 5A:
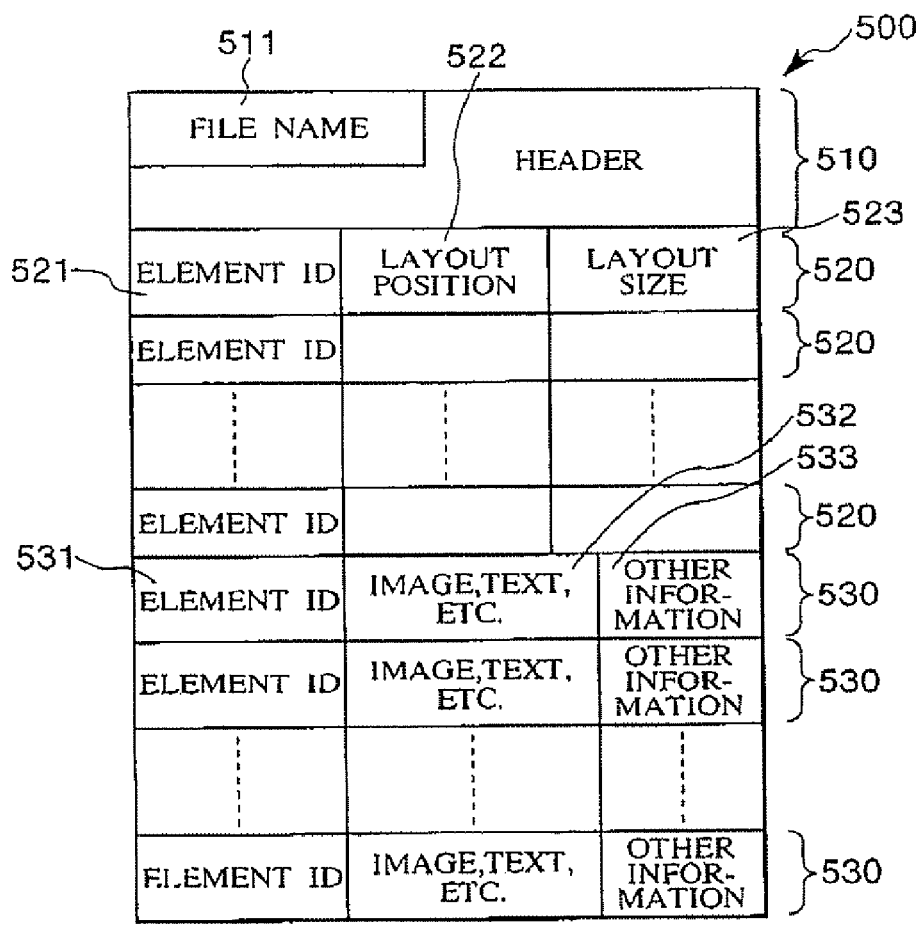
FIG. 5A is a view illustrating a configuration of a display information file, which is stored in an HDD of the server apparatus and transmitted to the cellular phone.

FIG. 5A is a view illustrating a configuration of a display information file 500. Such a display information file 500 is prepared for each kind of screen to be displayed on the display device 205 of the cellular phone 2. The display information file 500 is compressed in a predetermined format and stored in a display information file database of the HDD 103, and is transmitted from the server apparatus 1 to the cellular phone 2 in the compressed format. A file name 511 of the compressed display information file 500 is the same as that of the precompressed file except the extension.

As illustrated in FIG. 5A, a display information file 500 includes a file header 510 having a file name 511, element layout information 520, and individual element information 530. The file header 510 is a general file header and includes various control information in addition to the file name 511. The same name as an identifier for identifying the screen in the screen display request can be used as the file name 511.

The element layout information 520 is information of screen layouts of individual elements that configure the screen displayed on the display device 205 of the cellular phone 2 according to the display information file 500. The element layout information 520 is prepared for each element of the screen. The element layout information 520 includes an element ID 521, which is unique to the relevant element, a layout position 522, which indicates a position where, for example, the upper left of the relevant element is placed on the screen, and a layout size 523 indicating a size when the relevant element is placed on the screen.

The individual element information 530 is information of each element that configures the screen displayed on the display screen 205 of the cellular phone 2 according to the display information file 500. The individual element information 530 is also prepared for each element. The element layout information 520 and the individual element information 530 of all elements necessary to display the screen are included in the display information file 500. Information of any elements unnecessary to display the screen is not included in the display information file 500.

The individual element information 530 includes an element ID 531, information 532 such as an image or a text of the element and other information 533. For example, in a case where the element is an icon, the other information 533 is link information of processing associated with the icon. The other information 533 may not be included in the individual element information 530, depending on the type of the element.

The display information file 500, which has a file name corresponding to the screen display request from the cellular phone 2, is read from the display information file database and transmitted to the cellular phone 2 from the server apparatus 1. The cellular phone 2 receives the compressed display information file 500, temporarily stores the received file in the RAM 203, and decompresses the display information file 500. A screen, such as screens 400A and 400B, is generated base on the element layout information 520 and the individual element information 530 included in the decompressed display information file 500, and the generated screen is displayed on the display device 205.

Figure 5B:
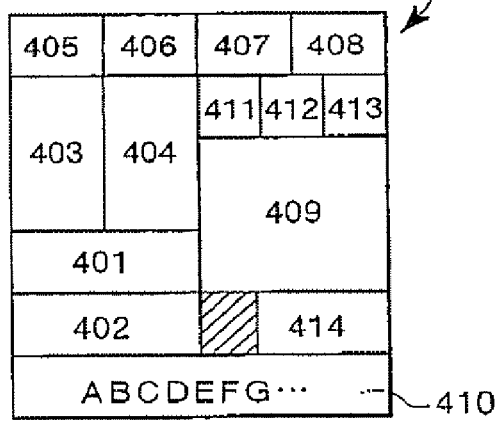
FIG. 5B is a conceptual view of the display information file for displaying the screen of FIG. 4A.
Figure 5C:
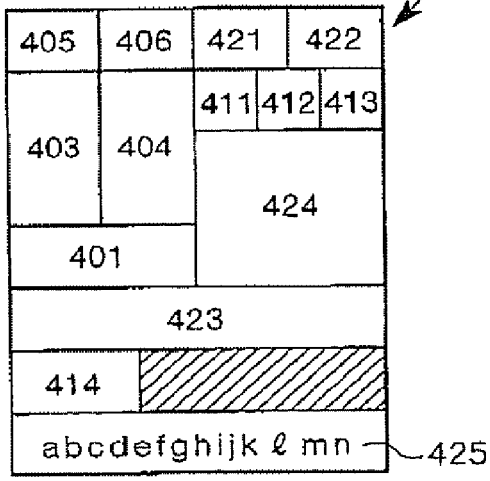
FIG. 5C is a conceptual view of the display information file for displaying the screen of FIG. 4B.

FIGS. 5B and 5C are conceptual views of the individual element information 530 in connection with the screen 400A of FIG. 4A and the screen 400B of FIG. 4B, respectively. The individual element information 530 of the display frames 401, 403 to 406 and the icons 411 to 414 is included in both the display information files 500 of the screen 400A and the screen 400B. The individual element information 530 of the display frames 402, 407, 408, the background 409, and the information 410 is included in only the display information file 500 of the screen 400A. The individual element information 530 of the icons 421, 422, the scroll bar 423, the background 424, and the information 425 are included in only the display information file 500 of the screen 400B.

The sizes of the display frames 401 to 404, scroll bar 423 and backgrounds 409 and 424 are smaller than their sizes when displayed on the display device 105. The length to width ratios of these elements are different from their ratios when displayed on the display device 105. An element having size and/or length to width ratio that is different when displayed has the size and/or length to width ratio of the element modified according to the layout size 523 by repeatedly using or expanding the information 532 of the element.

Figure 6:
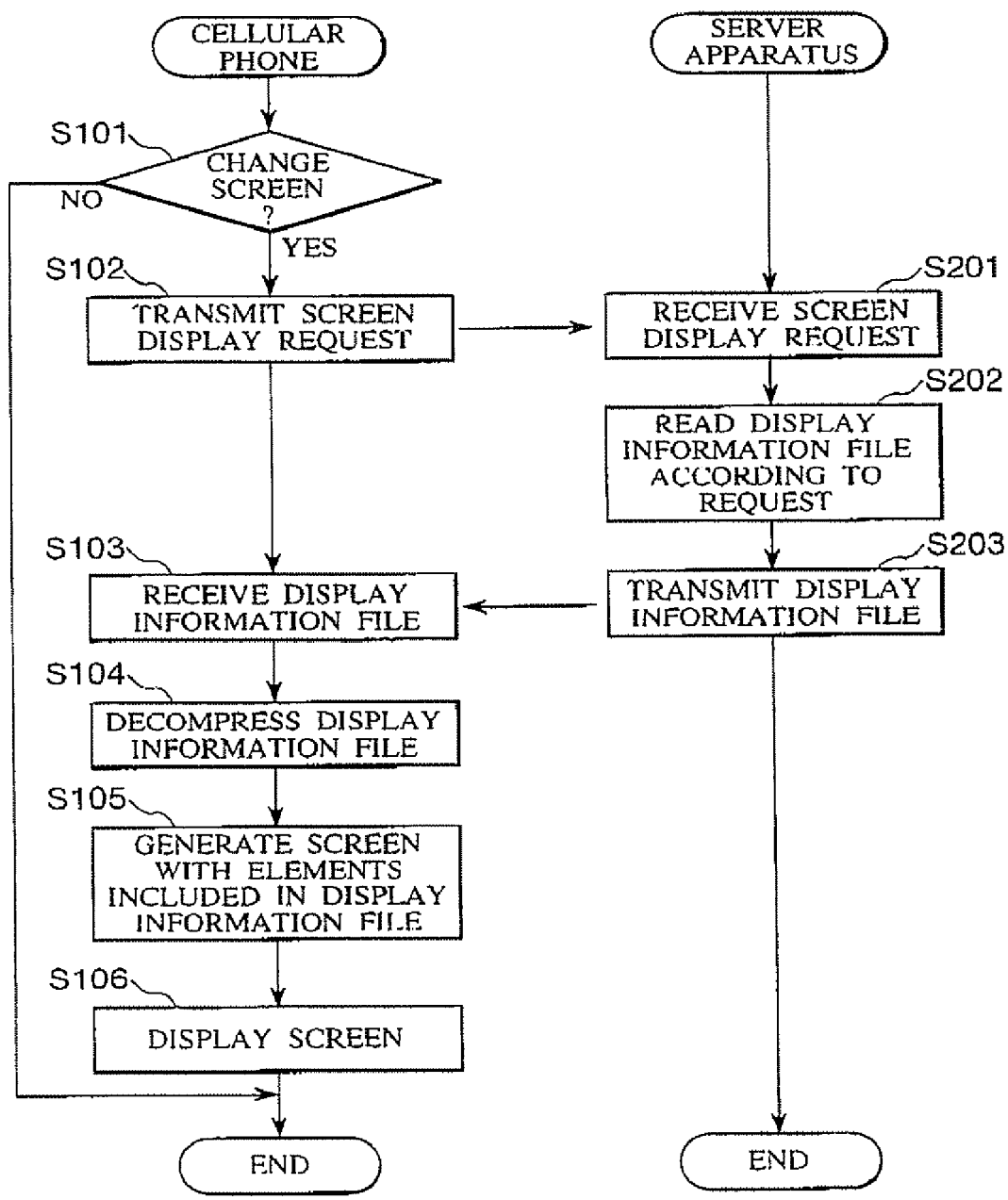
FIG. 6 is a flowchart illustrating processing in the communication system according to the first embodiment of the present invention.

The following will explain processing in the communication system according to this embodiment. FIG. 6 is a flowchart illustrating processing to be executed by each of the server apparatus 1 and the cellular phone 2 in the communication system according to this embodiment. In either of the server apparatus 1 and the cellular phone 2, processing different from that illustrated in the flowchart of FIG. 6 is carried out, but the following will explain only the processing necessary to explain the present invention. In the cellular phone 2, the CPU 201 determines whether there is an occurrence of an event to change the screen to be displayed on the display device 205 (step S101). When there is no occurrence of an event to change the screen, the CPU 201 ends the processing. When there is an occurrence of an event to change the screen, the CPU 201 generates a screen display request including a screen identifier corresponding to the screen to be displayed next. The communications device 206 transmits the generated screen display request to the server apparatus 1 via the network 3 under control of the CPU 201 (S102). After transmitting the screen display requests the CPU 201 of the cellular phone 2 waits to receive the display information file 500.

In the server apparatus 1, when the communications device 106 receives the screen display request from the cellular phone 2, the CPU 101 temporarily stores the received screen display request in a queue of the main memory 102 (step S201). The CPU 1001 sequentially fetches the screen display requests stored in the queue The CPU 101 reads the screen display request 500, which corresponds to the screen identifier included in the fetched screen display request, from the display information file database of the HDD 103 (step S202). The communications device 106 transmits the read display formation file 500 in a compressed form to the cellular phone 2 as a request source via the network 3 under control of the CPU 101 (step S203). Processing in the server apparatus 1 is completed.

In the cellular phone 2, when the communications device 206 receives the display information file 500 from the server apparatus 1, the CPU 201 temporarily stores the received display information file 500 in a predetermined area of the RAM 203 (step S103). The display information file 500 is stored in the RAM 203 in the compressed form. The CPU 201 decompresses the display information file 500 temporarily stored in the RAM 203 in the compressed form (step S104).

The CPU 201 sequentially reads the individual element information 530 included in the decompressed display information file 500, lays out the respective elements according to the layout position 522 and the layout size 523 indicated by the same element ID 521 among the element layout information 520, and generates a screen to be displayed on the display device 205. The CPU 201 develops an image of the generated screen in a frame memory prepared in the RAM 203 (step S105). The CPU 201 causes the display device 205 to display the screen developed in the frame memory of the RAM 203 (step S106). The new screen is displayed on the display device 205.

As explained above, in the communication system according to this embodiment, at the time of changing the screen to be displayed on the display device 205, the cellular phone 2 sends the screen display request including the screen identifier corresponding to the screen to be displayed next to the server apparatus 1. In response to the screen display request, the server apparatus 1 reads the display information file 500, which includes information of the elements necessary for displaying the relevant screen, from the display information file data of the HDD 103 and sends the read display information file 500 to the cellular phone 2. The cellular phone 2 generates a screen based on the elements included in the received display information file 500 and displays the generated screen on the display device 205.

The display information file 500 sent to the cellular phone 2 from the server apparatus 1 in response to the screen display request includes information of all elements necessary for generating the screen corresponding to the screen in one file. The display information file 500 only includes information of elements necessary for generating the relevant screen. Since the display information file 500 to be used for screen display is only one file, an amount of information of such as the file header 510, which is not directly related to the screen, may be reduced as much as possible. Accordingly, the RAM 203 of the cellular phone 2 may have a small amount of storage capacity to temporarily store information received from the server apparatus 1.

The display information file 500 compressed in a predetermined format is stored in the display information file database of the HDD 103 of the server apparatus 1 and transmitted to the cellular phone 2 as it is. Accordingly, the RAM 203 may have a smaller amount of storage capacity to temporarily store the received information, and an amount of information, which is transmitted and received via the network 3, may be also reduced as much as possible. Because communication between the server apparatus 1 and the cellular phone 2 includes communication between the base station 3c and the cellular phone 2, which has many restrictions on its communication capacity, an effect, which results from the reduction in the amount of information to be transmitted and received between the server apparatus 1 and the cellular phone 2, becomes large.

Every time when the screen to be displayed on the display device 205 is changed, the cellular phone 2 transmits the screen display request to the server apparatus 1 and receives the display information file 500 necessary for displaying the new screen from the server apparatus 1. This eliminates the need for preparing information to display a screen on the display device 205, thereby making it possible to reduce the storage capacity of the ROM 202 and that of RAM 203, The display information file 500 to display one screen is composed of only one file. This eliminates the need for multiple files for one screen, thereby making it possible to reduce a processing load of the CPU 201 of the cellular phone 2. When the present disclosure is applied to the cellular phone 2 having many restrictions on its structure, an effect, which results from the reduction in the storage capacity and the processing load, becomes large.

The display information file 500 sent to the cellular phone 2 from the server apparatus 2 is stored in the display information file database of the HDD 103 prepared for each screen. This enables the CPU 101 of the server apparatus 1 to send the corresponding display information file 500 immediately in response to the screen display request from the cellular phone 2. The screen information file 500 includes not only the individual element information 530, which is information of each element that configures the corresponding screen, but also the element layout information 520, which indicates the layout of each element This enables the CPU 201 of the cellular phone 2 to generate a screen to be displayed on the display device 205 by referring to only information included in the display information file 500.

The following will explain a second embodiment of the present invention with reference to the accompanying drawings.

The configuration of the communication system according to this embodiment is substantially the same as that of the first embodiment. According to this embodiment, in the server apparatus 1 the HDD 103 stores not the display information file database but an element library in which the individual elements, which can configure screens to be displayed on the display device 205, are registered one file by one file. The display information file 500 is generated according to the screen display request by extracting information of each element of the corresponding screen from the element library.

Figure 7A:
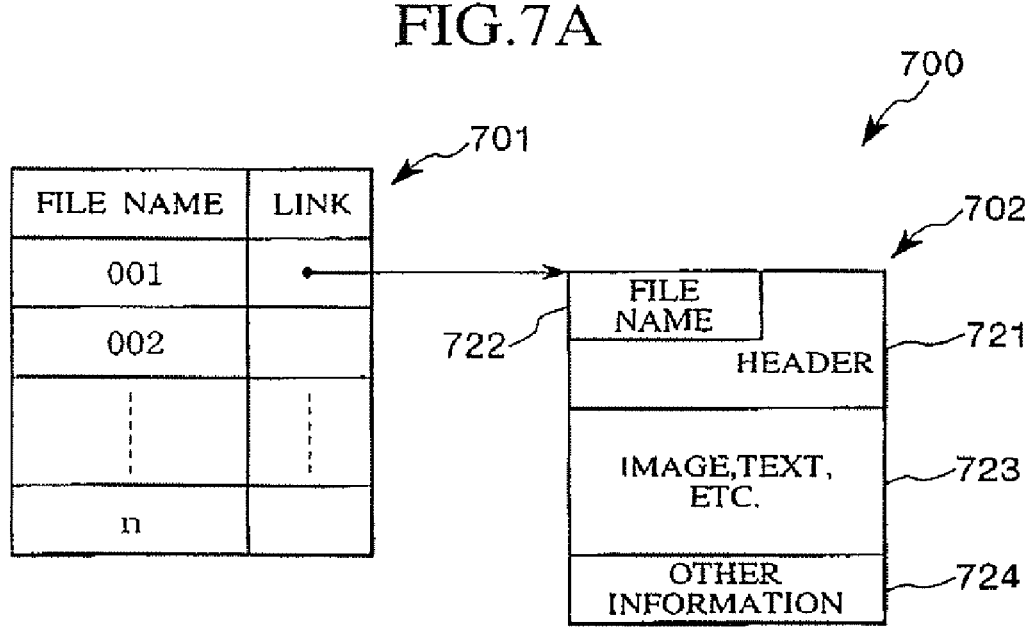
FIG. 7A is a view illustrating an element library to be stored in the HDD of the server apparatus in a communication system according to a second embodiment of the present invention.

FIG. 7A is a view illustrating a configuration of the element library 700 to be stored in the HDD 103. The element library 700 shown in FIG. 7A is composed of an element file registration table 701 and an element file 702 of each element In the element file registration table 701, a file name of each element and a storing destination address of a relevant element in the HDD 103 are associated with each other.

The element file 702 is prepared for each element that can configure the screens to be displayed on the display device 205 of the cellular phone 2. The element file 702 includes a file header 721 having a file name 722, information 723 such as an image or text of the relevant element, and other information 724. The file header 721, which is the general file header, includes various control information in addition to the file name 722. The same name as the element ID of the relevant element is used as the file name 722. The information 723 such as an image or text of the relevant element and other information 724 are the same as information 532 and 533 of FIG. 5A, respectively. The element file 702 is compressed in a predetermined format and stored in the element library.

Figure 7B:
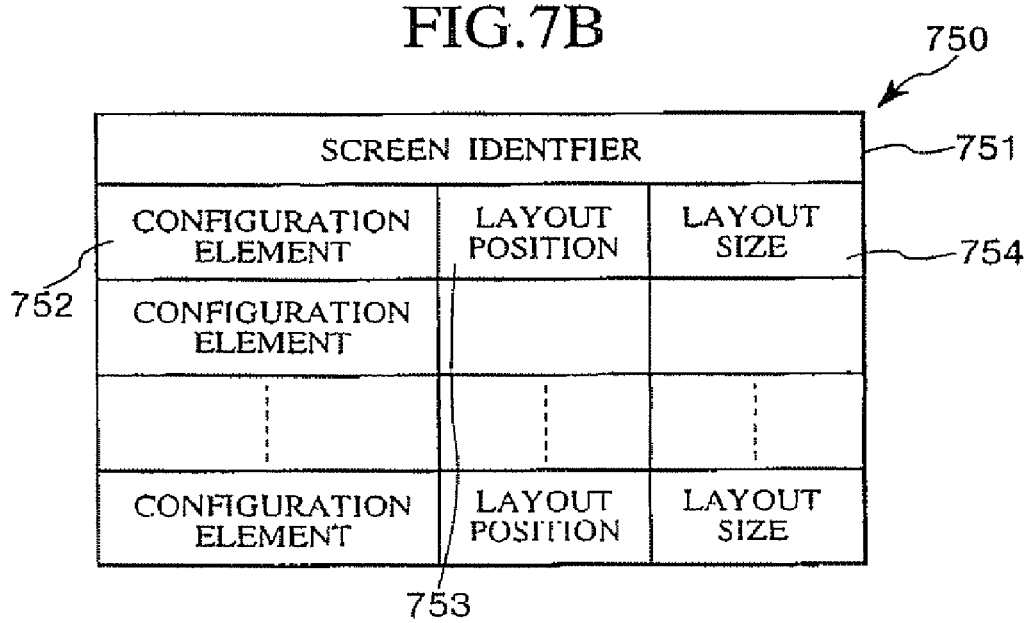
FIG. 7B is a view illustrating an element configuration, table to be stored in the HDD of the server apparatus in the communication system according to the second embodiment of the present invention.

FIG. 7B is a view illustrating a configuration of an element configuration table for generating the display information file in response to the screen display request sent from the cellular phone 2. The element configuration table is prestored in the HDD 103. An element configuration table 750 shown in FIG. 7B, is prepared for each screen to be displayed on the display device 205 of the cellular phone 2. The element configuration table 750 includes a screen identifier 751 which is the same as the screen identifier included in the corresponding screen display request. The screen identifier is used as a file name 511 of the display information file 500 to be generated.

In the element configuration table 750, a layout position 753 and a layout size 754 on the screen of the relevant element are registered to be associated with a configuration element 752 in connection with each element that configures the corresponding screen. The configuration element 752 indicates the file name 722 of the corresponding element file 702. The layout position 753 and the layout size 754 are the same as the layout position 522 and the layout size 523 included in the element layout information 520 of the display information file 500 illustrated in FIG. 5A, respectively.

When the screen display request is sent to the server apparatus 1 from the cellular phone 2, the element file 702 of the configuration elements, which are registered in the element configuration table 750 corresponding to the screen identifier included in the screen display request, is read from the element library 700. The server apparatus 1 generates a display information file 500 having the same format as that illustrated in FIG. 5A based on the element configuration table 750 and the read element file 702. The generated display information file 500 is compressed in a predetermined format and the resulting file is sent to the cellular phone 2 as a request source.

The following will explain processing in the communication system according to this embodiment. In this embodiment, the processing in the cellular phone 2 is the same as that explained in the first embodiment. Among the processing in the server apparatus 1, the processing of be second embodiment is different from that of the first embodiment in the processing after the time when the screen display request is received from the cellular phone 2 and before the time when the display information file 500 is sent to the cellular phone 2. The following will only explain the processing in the server apparatus 1.

Figure 8:
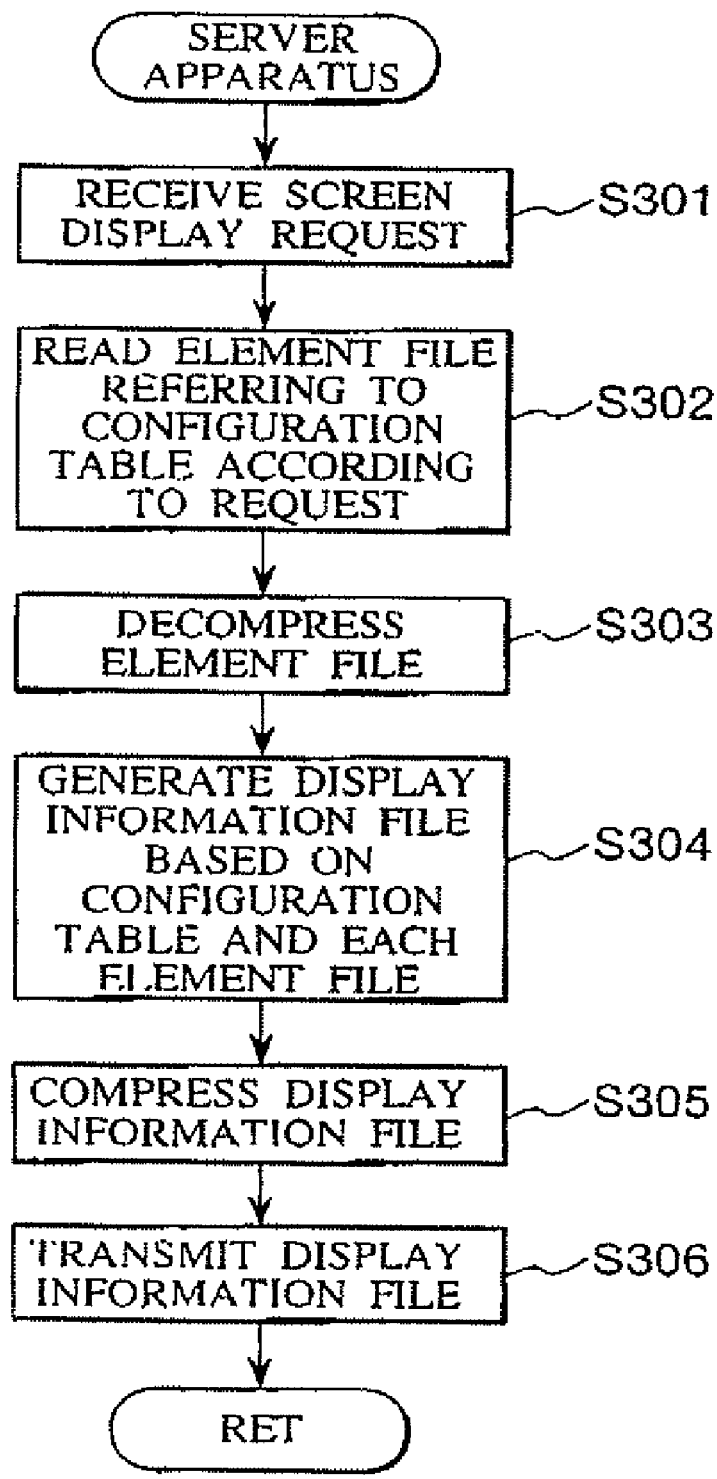
FIG. 8 is a flowchart illustrating processing to be executed by the server apparatus in the communication system according to the second embodiment of the present invention.

FIG. 8 is a flowchart illustrating the processing to be executed by the server apparatus 1 in this embodiment. In the server apparatus 1, when the communications device 106 receives the screen display request from the cellular phone 2, the CPU 101 temporarily stores the received screen display request in the queue of the main memory 102 (step S301), The CPU 101 sequentially fetches the screen display requests stored in the queue. The CPU 101 reads the element files 702, which correspond to the configuration elements 752 registered in the element configuration table 750 corresponding to the screen identifier included in the fetched screen display request, from the element library of the HD 103 (step S302). The CPU 101 decompresses the element file 702 read from the element library (step S303).

The CPU 101 generates a display information file 500 in the format as illustrated in FIG. 5A based on the element configuration table 750 and the decompressed element file 702 (step S304). More specifically, the CPU 101 generates the element layout information 520 in such a way that the configuration element. 752, the layout position 753, and the layout size 754, which are included in the element configuration table 750, are associated with the element ID 521, the layout position 522, and the layout size 523, respectively. The CPU 101 generates the individual element information 530 in such a way that the file name 722, the information 723 and other information 724, which are included in the element file 702 read from the element library, are associated with the element ID 531, the information 532 and the other information 533, respectively. The CPU 101 sets the screen identifier 751, which corresponds to the screen display request, as the file name 511 of the display information file 500. When these information items are stored as one file, the file header 510 is automatically generated, so that the display information file 500 is generated.

The CPU 101 compresses the generated display information file 500 in a predetermined format (step S305). The communications device 106 transmits the compressed display information file 500 to the cellular phone 2 as the request source via the network 3 under control of the CPU 101 (step S306). The processing in the server apparatus 1 ends.

As explained above, in the communication system according to this embodiment, at the time of changing the screen to be displayed on the display device 205, the cellular phone 2 sends the screen display request, which includes the screen identifier corresponding to the screen to be displayed next, to the server apparatus 1. In response to this screen display request, the server apparatus 1 generates the display information file 500 including information of elements necessary for displaying the screen, and sends the generated display information file 500 to the cellular phone 2. The cellular phone 2 generates the screen based on the elements included in the received display information file 500, and displays the screen on the display device 205.

Since the display information file 500 transmitted to the cellular phone 2 from the server apparatus 1 has the same format as that shown in the first embodiment, the same effect as that explained in the first embodiment can be obtained in the cellular phone 2 that receives the display information file 500 and the network 3 through which the display information file 500 is transmitted.

In this embodiment, the display information file 500 transmitted to the cellular phone 2 from the server apparatus 1 is generated based on the element file 702 stored in the element library 700 and the element configuration table 750 ever time when the screen display request is received from the cellular phone 2. There is a case in which an element of a screen to be displayed on the cellular phone 2 is used in multiple different screens. The element library may include only one element file 702 in connection with one element and the information of the same element is not registered therein. The storage capacity of the HDD 103, which is necessary to transmit the display information file 500 to the cellular phone 2, can be smaller than that in the first embodiment.

The present invention is not limited to the first and second embodiments and various modifications and applications may be possible. The following will explain exemplary modifications of the above embodiments to which he present invention can be applied.

In the first embodiment, the display information file 500 was compressed in a predetermined format and was stored in the display information file database, and was transmitted to the cellular phone 2 from the apparatus 1 in the compressed format. The display information file 500 may be stored in the display information file database without being compressed, and may be transmitted to the cellular phone 2 in the non-compressed format. The display information file 500 may be stored in the display information file database in the compressed format, and may be transmitted to the cellular phone 2 after being decompressed. In the second embodiment the display information file 500 may be also transmitted to the cellular phone 2 without being compressed In these cases, since the amount of information to be transmitted to the cellular phone 2 from the server apparatus 1 is increased, a load to he applied to the network 3 is also increased. However, this eliminates the need for decompressing the display information file 500 in the cellular phone 2, thereby reducing the processing load in the cellular phone 2.

In the second embodiment, each element file 702 in the element library 700 includes information for only one element, which can be configured for screens to be displayed on the display device 205. However, as described in Unexamined Japanese Patent Publication No. 8-305873, files including information for multiple elements may be stored in the element library 700. This makes it possible to reduce the storage capacity of the HDD 103, which is necessary to store data and to decrease processing required for a file search.

The first and second embodiments were explained on the assumption s the display devices 205 of the multiple cellular phones 2 were the same. However, if the types of the cellular phones 2 are different, the so of the display devices 205 are often different. The display information file database or the element library 700 may store the display information file 500 or the element file 702 for each type of cellular phone 2. The display information file 500 common to each type may be customize to adjust to the specification of the cellular phone 2 in the server apparatus 1 and the customized file 500 may be transmitted to the cellular phone 2. The cellular phone 2 may receive the display information file 500 common to each type, customize information of the respective elements included in the received display information file 500, and display the screen according to the customized information.

The above first and second embodiments explained the case as an example in which the present invention was applied to the communication system where the server apparatus 1 and the multiple cellular phones 2 are connected to one another via the network 3. However, the present invention can be applied to the communication system in which a terminal having a communication function other tan cellular is connected to the server apparatus. The network that connects the server apparatus and the terminal does not have to be a wide area network as in the networks 3, and it may be a local area network.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A display information transmitting method, executed by a server apparatus connected, via a network, to a terminal apparatus having a display that displays a next screen that includes a plurality of screen elements, different variations of the next screen each including necessary screen elements of the plurality of screen elements and at least one including less than all of the plurality of screen elements, the display being adapted to display less than all of the plurality of screen elements of the next screen, the method comprising:
   receiving a screen display request corresponding to the next screen to be displayed on the display, the screen display request being received from the terminal apparatus via the network when a current screen displayed on the display will be changed;
   reading a display information file corresponding to the screen display request from a display information file storage that stores a plurality of display information files, each of the plurality of display information files including all of the necessary screen elements of the plurality of screen elements included in one of the different variations of the next screen and no unnecessary screen elements of the plurality of screen elements included in others of the different variations of the next screen and not in the one of the different variations; and
   transmitting the read display information file to the terminal apparatus via the network,
   wherein the server reads and transmits the display information file without generating any of the next screen from the necessary screen elements included in the display information file.

2. The display information transmitting method according to claim 1, further comprising compressing the read display information file in a predetermined format and transmitting the compressed display information file to the terminal apparatus.

3. The display information transmitting method according to claim 1, wherein at least one of the necessary screen elements included in the display information file is included in another of the plurality of display information files.

4. A display information transmitting method, executed by a server apparatus connected, via a network, to a terminal apparatus having a display that displays a next screen that includes a plurality of screen elements, different variations of the next screen each including necessary screen elements of the plurality of screen elements and at least one including less than all of the plurality of screen elements, the display being adapted to display less than all of the plurality of screen elements of the next screen, the method comprising:
   receiving a screen display request corresponding to the next screen to be displayed on the display, the screen display request being received from the terminal apparatus via the network when a current screen displayed on the display will be changed;
   extracting all of the necessary screen elements of the plurality of screen elements included in one of the different variations of the next screen and no unnecessary screen elements of the plurality of screen elements included in others of the different variations of the next screen and not in the one of the different variations, the extracting corresponding to the screen display request and being from a screen element library storage that stores the plurality of screen elements of the next screen;
   generating a display information file using the extracted necessary screen elements; and
   transmitting the generated display information file to the terminal apparatus via the network,
   wherein the server generates and transmits the display information file without generating any of the next screen from the necessary screen elements included in the display information file.

5. The display information transmitting method according to claim 4, further comprising compressing the generated display information file in a predetermined format and transmitting the compressed display information file to the terminal apparatus.

6. The display information transmitting method according to claim 5, wherein at least one of the necessary screen elements included in the display information file is included in another of the different variations.

7. A display information receiving method, executed by a terminal apparatus connected to a server apparatus via a network and having a display that displays a next screen that includes a plurality of screen elements, different variations of the next screen each including necessary screen elements of the plurality of screen elements and at least one including less than all of the plurality of screen elements, the display being adapted to display less than all of the plurality of screen elements of the next screen, the method comprising:
   transmitting a screen display request corresponding to the next screen to be displayed on the display, the screen display request being transmitted when a current screen displayed on the display will be changed;
   receiving a display information file corresponding to the screen display request and including all of the necessary screen elements of the plurality of screen elements included in one of the different variations of the next screen and no unnecessary screen elements of the plurality of screen elements included in others of the different variations of the next screen and not in the one of the different variations;

storing the received display information file in a storage;

generating the next screen to be displayed on the display based on the necessary screen elements included in the stored display information file; and displaying the generated next screen on the display, wherein the display information file is received without any of the next screen being generated from the necessary screen elements included in the display information file.

8. A display information transmitting and receiving system for displaying a next screen that includes a plurality of screen elements, different variations of the next screen each including necessary screen elements of the plurality of screen elements and at least one including less than all of the plurality of screen elements, the system comprising:

a server apparatus, including:

a display information file storage that stores a plurality of display information files, each of the plurality of display information files including all of the necessary screen elements of the plurality of screen elements included in one of the different variations of the next screen and no unnecessary screen elements of the plurality of screen elements included in others of the different variations of the next screen and not in the one of the different variations;

a screen display request receiver that receives a screen display request;

a display information file reader that reads a display information file corresponding to the received screen display request from among the plurality of display information files from the display information file storage; and a display information file transmitter that transmits the read display information file, and a terminal apparatus connected to the server apparatus via a network and having a display that displays the next screen, the display being adapted to display less than all of the plurality of screen elements of the next screen, the terminal apparatus including:

a screen display request transmitter that transmits the screen display request corresponding to the next screen to be displayed on the display, the screen display request transmitted to the server apparatus via the network when a current screen displayed on the display will be changed;

a display information file receiver that receives the display information file transmitted by the server in response to the transmitted screen display request;

a display file storage that stores the received display information file;

a screen generator that generates the next screen on the display based on the necessary screen elements included in the stored display information file; and an information display controller that causes the display to display the next screen generated by the screen generator, wherein the server apparatus reads and transmits the display information file without generating any of the next screen from the necessary screen elements included in the display information file.

9. The display information transmitting and receiving system according to claim 8, wherein the terminal apparatus comprises a cellular phone, and the network comprises a cellular phone network.

10. A display information transmitting and receiving system for displaying a next screen that includes a plurality of screen elements, different variations of the next screen each including necessary screen elements of the plurality of screen elements and at least one including less than all of the plurality of screen elements, the system comprising:

a server apparatus, including:

a screen element library storage that stores the plurality of screen elements of the next screen;

a screen display request receiver that receives a screen display request for displaying the next screen on a display;

a display information file generator that extracts, from among the plurality of screen elements stored in the screen element library storage and corresponding to the received screen display request, all of the necessary screen elements of the plurality of screen elements included in one of the different variations of the next screen and no unnecessary screen elements of the plurality of screen elements included in others of the different variations of the next screen and not in the one of the different variations;

a display information file generator that generates a display information file including the extracted necessary screen elements and not including the unnecessary screen elements; and a display information file transmitter that transmits the generated display information file, and a terminal apparatus connected to the server apparatus via a network and having the display that displays the next screen, the display being adapted to display less than all of the plurality of screen elements of the next screen, the terminal apparatus including:

a screen display request transmitter that transmits the screen display request corresponding to the next screen to be displayed on the display, the screen display request being transmitted to the server apparatus via the network when a current screen displayed on the display will be changed;

a display information file receiver that receives the display information file transmitted by the server in response to the transmitted screen display request;

a display file storage that stores the received display information file;

a screen generator that generates the next screen on the display based on the necessary screen elements included in the stored display information file; and an information display controller that causes the display to display the next screen generated by the screen generator, wherein the server apparatus generates and transmits the display information file without generating any of the next screen from the necessary screen elements included in the display information file.

11. The display information transmitting and receiving system according to claim 10, wherein the terminal apparatus comprises a cellular phone, and the network comprises a cellular phone network.

12. A display information transmitting apparatus, connected to a terminal apparatus having a display that displays a next screen that includes a plurality of screen elements, different variations of the next screen each including necessary screen elements of the plurality of screen elements and at least one including less than all of the plurality of screen elements, the display being adapted to display less than all of the plurality of screen elements of the next screen, the apparatus comprising:

a display information file storage that stores a plurality of display information files, each of the plurality of display information files including all of the necessary screen elements of the plurality of screen elements included in one of the different variations of the next screen and no unnecessary screen elements of the plurality of screen elements included in others of the different variations of the next screen and not in the one of the different variations;

a screen display request receiver that receives a screen display request corresponding to the next screen to be displayed on the display, the screen display request being received from the terminal apparatus when a current screen displayed on the display of the terminal apparatus will be changed;

a display information file reader that reads a display information file corresponding to the received screen display request from among the plurality of display information files from the display information file storage; and a display information file transmitter that transmits the read display information file to the terminal apparatus via the network, wherein the display information file is read and transmitted without generating any of the next screen from the necessary screen elements included in the display information file.

13. The display information transmitting apparatus according to claim 12, wherein the terminal apparatus comprises a cellular phone, and the network comprises a cellular phone network.

14. A display information transmitting apparatus, connected to a terminal apparatus having a display that displays a next screen that includes a plurality of screen elements, different variations of the next screen each including necessary screen elements of the plurality of screen elements and at least one including less than all of the plurality of screen elements, the display being adapted to display less than all of the plurality of screen elements of the next screen, the apparatus comprising:

a screen element library storage that stores the plurality of screen elements of the next screen;

a screen display request receiver that receives a screen display request corresponding to the next screen to be displayed on the display, the screen display request being transmitted from the terminal apparatus when a current screen displayed on the display of the terminal apparatus will be changed;

a display information file generator that extracts, from among the plurality of screen elements stored in the screen element library storage and corresponding to the received screen display request, all of the necessary screen elements of the plurality of screen elements included in one of the different variations of the next screen and no unnecessary screen elements of the plurality of screen elements included in others of the different variations of the next screen and not in the one of the different variations;

a display information file generator that generates a display information file including the extracted necessary screen elements and not including the unnecessary screen elements; and a display information file transmitter that transmits the generated display information file to the terminal apparatus via the network, wherein the display information file is generated and transmitted without generating any of the next screen from the necessary screen elements included in the display information file.

15. The display information transmitting apparatus according to claim 14, wherein the terminal apparatus comprises a cellular phone, and the network comprises a cellular phone network.

16. A display information receiving apparatus, connected to a server apparatus via a network, having a display that displays a next screen that includes a plurality of screen elements, different variations of the next screen each including necessary screen elements of the plurality of screen elements and at least one including less than all of the plurality of screen elements, the display being adapted to display less than all of the plurality of screen elements of the next screen, the display information receiving apparatus comprising:

a screen display request transmitter that transmits a screen display request corresponding to the next screen to be displayed on the display, the screen display request being transmitted to the server apparatus via the network when a current screen displayed on the display will be changed;

a display information file receiver that receives a display information file from the server apparatus in response to the transmitted screen display request, the display information file corresponding to the screen display request and including all of the necessary screen elements of the plurality of screen elements included in one of the different variations of the next screen and no unnecessary screen elements of the plurality of screen elements included in others of the different variations of the next screen and not in the one of the different variations;

a display file storage that stores the received display information file;

a screen generator that generates the next screen to be displayed on the display based on the necessary screen elements included in the stored display information file; and an information display controller that causes the display to display the next screen generated by the screen generator, wherein the display information file is received without any of the next screen being generated from the necessary screen elements included in the display information file.

17. The display information receiving apparatus according to claim 16, wherein the a screen receiving apparatus comprises a cellular phone, and the network comprises a cellular phone network.

18. A display information transmitting program stored in a non-transitory computer readable storage medium and executed by a server apparatus connected to a terminal apparatus having a display that displays a next screen that includes a plurality of screen elements, different variations of the next screen each including necessary screen elements of the plurality of screen elements and at least one including less than all of the plurality of screen elements, the display being adapted to display less than all of the plurality of screen elements of the next screen, the display information transmitting program comprising:

a screen display request receiving code section that receives a screen display request from the terminal apparatus when a current screen displayed on the display of the terminal apparatus will be changed;

a display information file reading code section that reads a display information file corresponding to the received screen display request from a display information file storage that stores a plurality of display information files, each of the plurality of display information files including all of the necessary screen elements of the plurality of screen elements included in one of the different variations of the next screen and no unnecessary screen elements of the plurality of screen elements included in others of the different variations of the next screen and not in the one of the different variations; and a display information file transmitting code section that transmits the read display information file to the terminal apparatus via the network, wherein the server reads and transmits the display information file without generating any of the next screen from the necessary screen elements included in the display information file.

19. A display information transmitting program stored in a non-transitory computer readable storage medium and executed by a server apparatus connected to a terminal apparatus having a display that displays a next screen that includes a plurality of screen elements, different variations of the next screen each including necessary screen elements of the plurality of screen elements and at least one including less than all of the plurality of screen elements, the display being adapted to display less than all of the plurality of screen elements of the next screen, the display information transmitting program comprising:

a screen display request receiving code section that receives a screen display request from the terminal apparatus when a current screen displayed on the display of the terminal apparatus will be changed;

a display information file extracting section that extracts all of the necessary screen elements of the plurality of screen elements included in one of the different variations of the next screen and no unnecessary screen elements of the plurality of screen elements included in others of the different variations of the next screen and not in the one of the different variations, the extracting corresponding to the received screen display request and being from an element library storage that stores the plurality of screen elements of the next screen;

a display information file generating section that generates a display information file including the extracted necessary screen elements and not including the unnecessary screen elements; and a display information file transmitting code section that transmits the generated display information file to the terminal apparatus via the network, wherein the display information file is generated and transmitted without generating any of the next screen from the necessary screen elements included in the display information file.

20. A display information receiving program stored in a non-transitory computer readable storage medium and executed by a terminal apparatus connected to a server apparatus via a network, the terminal apparatus having a display which displays a next screen that includes a plurality of screen elements, different variations of the next screen each including necessary screen elements of the plurality of screen elements and at least one including less than all of the plurality of screen elements, the display being adapted to display less than all of the plurality of screen elements of the next screen, the display information receiving program comprising:

a screen display request transmitting code section that transmits a screen display request corresponding to the next screen to be displayed on the display, the screen display request transmitted when a current screen displayed on the display will be changed;

a display information file receiving code section that receives a display information file from the server apparatus in response to the transmitted screen display request, the display information file including all of the necessary screen elements of the plurality of screen elements included in one of the different variations of the next screen and no unnecessary screen elements of the plurality of screen elements included in others of the different variations of the next screen and not in the one of the different variations;

a screen generating code section that generates the next screen to be displayed on the display based on the necessary screen elements included in the received display information file; and an information display controlling code section that causes the display to display the next screen generated by the screen generating section, wherein the display information file is received without any of the next screen being generated from the necessary screen elements included in the display information file.

21. A display information file stored in a non-transitory computer readable storage medium, the display information file being transmitted from a server apparatus via a network to a terminal apparatus for displaying a screen that includes a plurality of screen elements on a display of the terminal apparatus, different variations of the screen each including necessary screen elements of the plurality of screen elements and at least one including less than all of the plurality of screen elements, the display being adapted to display less than all of the plurality of screen elements of the screen, the display information file comprising:

all of the necessary screen elements of the plurality of screen elements included in one of the different variations of the next screen and no unnecessary screen elements of the plurality of screen elements included in others of the different variations of the screen and not in the one of the different variations, wherein the display information file is transmitted from the server apparatus to the terminal apparatus via the network without any of the next screen being generated from the necessary screen elements included in the display information file.

* * * * *